(12) United States Patent
Migos et al.

(10) Patent No.: US 8,615,779 B2
(45) Date of Patent: Dec. 24, 2013

(54) ELECTRONIC PROGRAM GUIDE (EPG) SEARCH

(75) Inventors: Charles J. Migos, San Francisco, CA (US); Ronald A. Morris, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 781 days.

(21) Appl. No.: 11/811,747

(22) Filed: Jun. 12, 2007

(65) Prior Publication Data

US 2008/0313672 A1  Dec. 18, 2008

(51) Int. Cl.
*H04N 5/445* (2011.01)
*G06F 3/00* (2006.01)

(52) U.S. Cl.
USPC .............. 725/53; 725/45; 715/810; 715/816; 715/825

(58) Field of Classification Search
USPC .......................................... 725/44–45, 52–53
See application file for complete search history.

(56) References Cited

U.S. PATENT DOCUMENTS

| | | | |
|---|---|---|---|
| 6,005,631 A | | 12/1999 | Anderson et al. |
| 6,499,029 B1 | | 12/2002 | Kurapati et al. |
| 2001/0013126 A1 * | 8/2001 | Lemmons et al. | 725/53 |
| 2003/0014753 A1 * | 1/2003 | Beach et al. | 725/53 |
| 2003/0046698 A1 | 3/2003 | Kamen et al. | |
| 2003/0220100 A1 * | 11/2003 | McElhatten et al. | 455/418 |
| 2004/0194141 A1 | 9/2004 | Sanders | |
| 2004/0221310 A1 * | 11/2004 | Herrington et al. | 725/46 |
| 2005/0240963 A1 * | 10/2005 | Preisman et al. | 725/44 |
| 2005/0289593 A1 | 12/2005 | Spilo | |
| 2006/0026647 A1 * | 2/2006 | Potrebic et al. | 725/53 |
| 2006/0066755 A1 | 3/2006 | Kowald et al. | |
| 2006/0101504 A1 | 5/2006 | Aravamudan et al. | |
| 2006/0130098 A1 | 6/2006 | Rao et al. | |
| 2006/0156240 A1 * | 7/2006 | Lemay et al. | 715/730 |
| 2006/0167903 A1 * | 7/2006 | Smith et al. | 707/100 |
| 2007/0016931 A1 | 1/2007 | Ichioka et al. | |
| 2007/0055991 A1 | 3/2007 | Choi et al. | |
| 2007/0060176 A1 * | 3/2007 | Sloo | 455/466 |
| 2007/0204308 A1 * | 8/2007 | Nicholas et al. | 725/86 |
| 2008/0086688 A1 * | 4/2008 | Chandratillake et al. | 715/719 |
| 2008/0307343 A1 * | 12/2008 | Robert et al. | 715/765 |

OTHER PUBLICATIONS

Gutta, et al., "TV Content Recommender System", Date: 2000, pp. 1-2, American Association for Artificial Intelligence.
Lee, et al., "Personalized Contents Guide and Browsing based on User Preference", pp. 1-10, Date=2002.
Concejero, et al., "Usability testing of an Electronic Programme Guide and Interactive TV applications", pp. 1-8, Date=1997.
Kazasis, et al., "Designing Ubiquitous Personalized TV-Anytime Services", pp. 136-149, Date=2000.

* cited by examiner

*Primary Examiner* — Vivek Srivastava
*Assistant Examiner* — Carmine Malangone
(74) *Attorney, Agent, or Firm* — Wolfe-SBMC

(57) ABSTRACT

Techniques are described to perform electronic program guide (EPG) search. In an implementation, electronic program guide (EPG) data is searched that describes television content and has a plurality of categories. Results of the search are output in an EPG and arranged according to one or more of the categories.

20 Claims, 7 Drawing Sheets

ELECTRONIC PROGRAM GUIDE (EPG) SEARCH

BACKGROUND

The range of television content that is available to users is ever increasing. For example, users initially received television content from an over-the-air broadcast which was captured by an antenna. Subsequently, delivery techniques and the content available via these techniques have continued to expand, from cable television to digital cable television, satellite television, and so on. As these techniques have expanded so to has the amount of content available to users such that users that were initially provided with a handful of channels via the over-the-air broadcast are now able to access hundreds of channels that may have different types of television content, such as television programs, video-on-demand, and so forth.

One technique that has been developed to help the users navigate through this vast amount of content is through the use of an electronic program guide (EPG). The EPG provides functionality similar to a printed program guide by informing the users as to which television content is available and where that television content is located, e.g., what channel is broadcasting the particular television content. The EPG may also provide additional functionality to enable users to actually navigate to particular television content represented in the EPG, cause the content to be recorded by a digital video recorder, order pay-per-view content, and so on.

To enable the users to locate particular television content of interest, techniques were developed to search the EPG for particular television content of interest, such as through a keyword search. These techniques, however, were limited in that results of the search were often provided in a haphazard manner such that each item of television content having the keyword was output as a result. Therefore, to navigate through these search results, the user was often forced to manually enter and reenter keywords to perform ever more detailed searches until a desired item to television content was found, which was often time consuming and frustrating to the users.

SUMMARY

Techniques are described to perform electronic program guide (EPG) search. In an implementation, electronic program guide (EPG) data is searched that describes television content and has a plurality of categories. Results of the search are output in an EPG and arranged according to one or more of the categories.

In another implementation, an EPG is output having a plurality of portions that include data which describes television content. When a focus is applied to at least one of the portions, additional data is output within the at least one portion of the EPG that further describes the television content.

In a further implementation, one or more computer-readable media include instructions that are executable to encapsulate a plurality of related television content into a single object. The single object includes metadata which describes the plurality of related television content to be output in an EPG.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
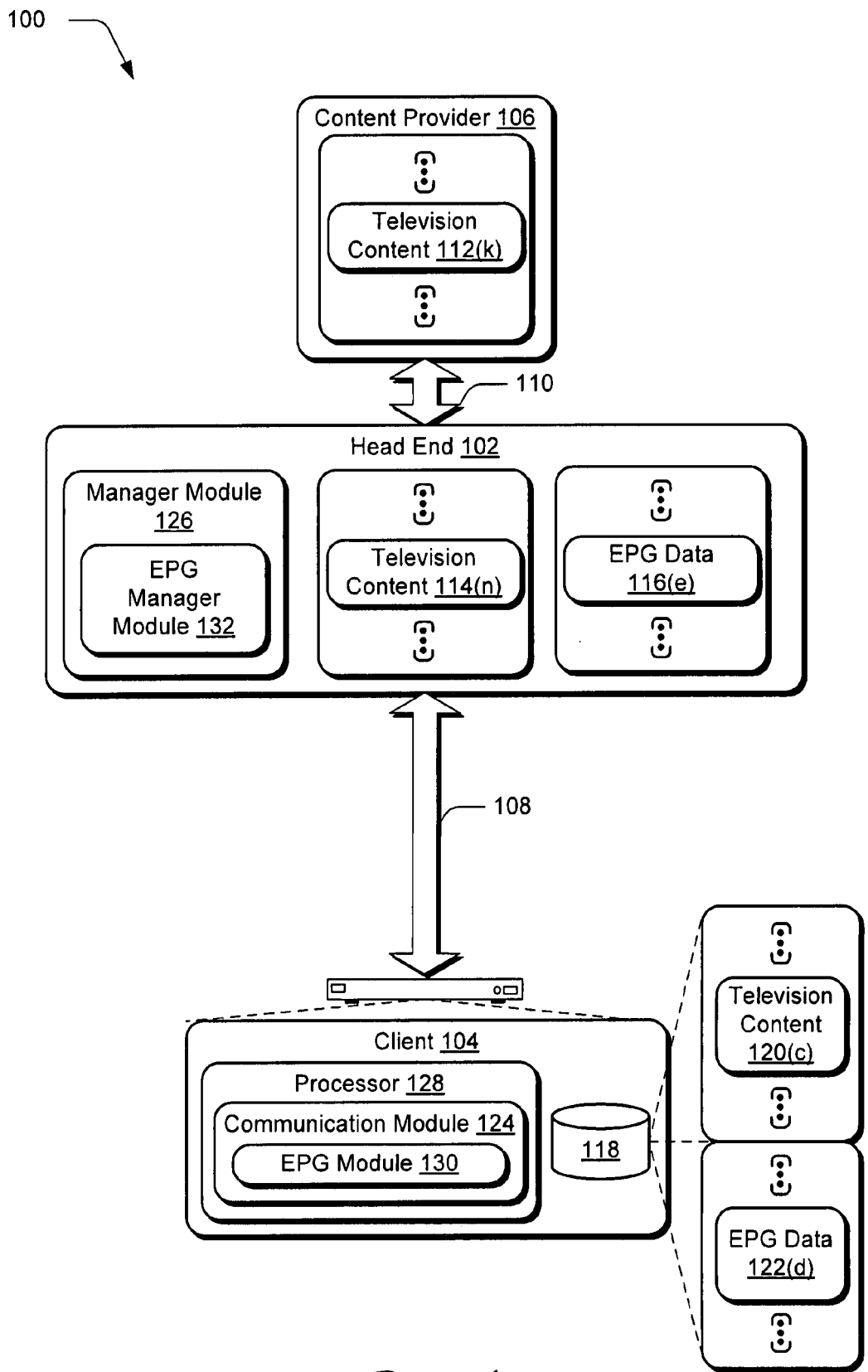
FIG. 1 is an illustration of an environment in an exemplary implementation that is operable to employ techniques related to electronic program guide (EPG) data.

Traditional electronic program guides (EPGs) were configured to inform users as to which television content is available and where that television content is located by manually navigating through "cells" in the EPG to locate television content. To give an alternative to this manual navigation, search functionality was incorporated within these traditional EPGs, such as through use of a keyword search. When keyword search was incorporated within the traditional EPG, however, the results were not organized and therefore could overwhelm the users. Therefore, to reduce the amount of results to locate a particular item of interest, the user was often forced to manually enter additional keywords to perform ever more detailed searches until a desired item of television content was found, which was often time consuming and frustrating to the users.

Techniques are described to perform EPG search. In an implementation, an EPG is arranged into categories that may be navigated by a user. For example, to search for the television series the "West Wing", the user may provide the term "West" to search functionality of the EPG. Results of the search may then be categorized and output such that the user may navigate "down" through different categories and sub-categories to find a particular item of interest. Thus, the results of the search may assume a hierarchical arrangement according to categories that may be used to further define groups of the EPG data, and more particularly the television content described by the EPG data. In at least one implementation, the individual results may be configured such that when "focus" is applied, additional information related to the focused item is output, thereby providing a "clean" EPG that may use a non-modal method to gain additional information without navigating away from a currently displayed "page" of the EPG.

In a further implementation, "like" television content described in the EPG is encapsulated within a single object to further ease organization and access of the EPG data and its described television content. Continuing with the previous example, individual episodes of the television series the "West Wing" may be encapsulated within a single object that has metadata which describes the series as a whole. Therefore, a search result may be output that references the single object, instead of each of the individual episodes. When a user wishes to access a particular episode, the user may "drill down" through the encapsulation object to the individual episodes to locate the particular episode. In this way, the "clutter" of each of the individual episodes in response to a search of EPG data may be reduced, thereby improving the overall user experience.

In the following discussion, an exemplary environment is first described that is operable to perform techniques to search EPG data. Exemplary procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

FIG. 1 is an illustration of an environment 100 in an exemplary implementation that is operable to customize and expose subtitle data. The illustrated environment 100 includes a head end 102 of a network operator, a client 104 and a content provider 106 that are communicatively coupled, one to another, via network connections 108, 110. In the following discussion, the head end 102, the client 104 and the content provider 106 may be representative of one or more entities, and therefore reference may be made to a single entity (e.g., the client 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software and/or a machine.

The content provider 106 includes one or more items of television content 112(k), where "k" can be any integer from 1 to "K". The television content 112(k) may include a variety of data, such as television programming, video-on-demand (VOD) files, and so on. The television content 112(k) is communicated over the network connection 110 to the head end 102. In the following discussion, television content may also be referred to simply as "content".

Television content 112(k) communicated via the network connection 110 is received by the head end 102 and may be stored as one or more items of television content 114(n), where "n" can be any integer from "1" to "N". The television content 114(n) may be the same as or different from the television content 112(k) received from the content provider 106. The television content 114(n), for instance, may include additional data for broadcast to the client 104.

One example of this additional data is illustrated in FIG. 1 as electronic program guide (EPG) data 116(e), where "e" can be any integer from one to "E". The EPG data 116(e) may be obtained from an EPG database for broadcast to the client 104, such as through use of a carousel file system. The carousel file system repeatedly broadcasts the EPG data over an out-of-band (OOB) channel to the client 104 over the network connection 108. Distribution from the head end 102 to the client 104 may be accommodated in a number of ways, including cable, radio frequency (RF), microwave, digital subscriber line (DSL), satellite, via Internet Protocol (IP) connection, and so on. Although the EPG data 116(e) is illustrated as being provided by the head end 102 for the sake of simplicity of the figure, it should be readily apparent that the EPG data 116(e) may originate from a wide variety of sources, such as a stand alone third-party provider.

The client 104, as previously stated, may be configured in a variety of ways to receive the television content 114(n) and the EPG data 116(e) over the network connection 108. The client 104 typically includes hardware and software to transport and decrypt content 114(n) and the EPG data 116(e) received from the head end 102 for rendering by the illustrated display device. Although a display device is shown, a variety of other output devices are also contemplated, such as speakers.

The client 104 may also include digital video recorder (DVR) functionality. For instance, the client 104 may include memory 118 to record television content 114(n) as television content 120(c) (where "c" can be any integer from one to "C") received via the network connection 108 for output to and rendering by the display device. The memory 118 may be configured in a variety of ways, such as a hard disk drive, a removable computer-readable medium (e.g., a writable digital video disc), semiconductor based memory, and so on. Thus, television content 120(c) that is stored in the memory 118 of the client 104 may be copies of the television content 114(n) that was streamed from the head end 102. Additionally, the memory 118 may also be used to store EPG data 116(e) as EPG data 122(d), where "d" can be any integer from one to "D".

The client 104 includes a communication module 124 that is executable on the client 104 to control content playback on the client 104, such as through the use of one or more "command modes", i.e., "trick modes", to tune to a particular channel, order pay-per-view content, and so on. The command modes may provide non-linear playback of the content 120(c) (i.e., time shift the playback of the content 120(c)) such as pause, rewind, fast forward, slow motion playback, and the like.

The head end 102 is illustrated as including a manager module 126. The manager module 126 is representative of functionality to configure television content 114(n) for output (e.g., streaming) over the network connection 108 to the client 104. The manager module 126, for instance, may configure content 112(k) received from the content provider 106 to be suitable for transmission over the network connection 108, such as to "packetize" the content for distribution over the Internet, configuration for a particular broadcast channel, map the television content 112(k) to particular channels, and so on.

Thus, in the environment 100 of FIG. 1, the content provider 106 may broadcast the television content 112(k) over a network connection 110 to a multiplicity of network operators, an example of which is illustrated as head end 102. The head end 102 may then stream the television content 114(n) over a network connection to a multitude of clients, an example of which is illustrated as client 104. The client 104 may then store the television content 114(n) in the memory 118 as television content 120(c) and/or render the television content 114(n) immediately for output as it is received, such as when the client 104 is configured to include digital video recorder (DVR) functionality.

The client is illustrated as executing the communication module 124 on a processor 128, which is also storable in memory 118. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 118 is shown for the client 104, a wide variety of types and combinations of memory may be employed, such as random access memory (RAM), hard disk memory, removable medium memory, and other types of computer-readable media.

The communication module 124 is also illustrated as including an EPG module 130 which is representative of functionality that may be employed to generate and manage an EPG from the EPG data 122(d). For instance, the EPG module 130 may receive EPG data 116(e) from the head end 102 (e.g., directly and/or from memory 118 as EPG data 122(d)) and process the data to create and output an EPG, an example of which is illustrated in FIG. 1 as being output on the display device. The EPG module 130 may also provide additional functionality related to interaction of a user with the EPG.

The EPG module 130, for instance, may also be representative of search functionality related to the EPG data 122(d). For example, the EPG module 130 may accept a collection of characters (e.g., keywords) as input by a user and find EPG data 122(d) that corresponds to the collection and thus television content described by the EPG data 122(d). Results of this search may be provided in a variety of ways.

In an implementation, the EPG data 122(d) is arranged according to a plurality to categories. These categories are then used to arrange the EPG data in the search result. For example, categories and sub-categories may be used to create a hierarchy through which the user may navigate to locate particular television content of interest. Therefore, instead of receiving an oftentimes lengthily list of the EPG data 122(d) that meets the criteria of a proposed search, the search result may be organized in a way that is intuitive for a user to navigate, an example of which may be found in the embodiments of the exemplary user interfaces shown in FIGS. 2-6.

In another implementation, the EPG module 130 encapsulates EPG data 116(e), 122(d) that describes related television content 114(n), 120(c). For example, a user may wish to search for a television series "West Wing". Traditional searches would return and output each individual episode of the West Wing separately in the user interface, which could needlessly consume valuable display space, especially if the user was looking for "West Wing, the Movie" as opposed to the television series. Therefore, in this implementation the television series the "West Wing" may be captured as a single object that is output in the EPG to represent the series as a whole. Additionally, metadata may be associated with the object to describe the series, such as actors, a particular season, and so on thereby reducing an amount of data employed by entries for each of the episodes in the EPG data 116(e), 120(c). Further discussion of encapsulation may be found in relation to the following exemplary procedures and user interfaces.

It should be noted that one or more of the entities shown in FIG. 1 may be further divided (e.g., the head end 102 may be implemented by a plurality of servers in a distributed computing system), combined (e.g., the head end 102 may incorporate functionality to generate the EPG data 116(e)), and so on and thus the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide EPG search are platform-independent, meaning that the techniques may be implemented on a variety of commercial computing platforms having a variety of processors.

Exemplary User Interfaces

The following discussion describes exemplary user interfaces that may be output by the previously described exemplary environment, as well as other environments. Thus, although portions of the following discussion refer to the environment 100 of FIG. 1, the following discussion should not necessarily be limited to that environment 100.

Figure 2:
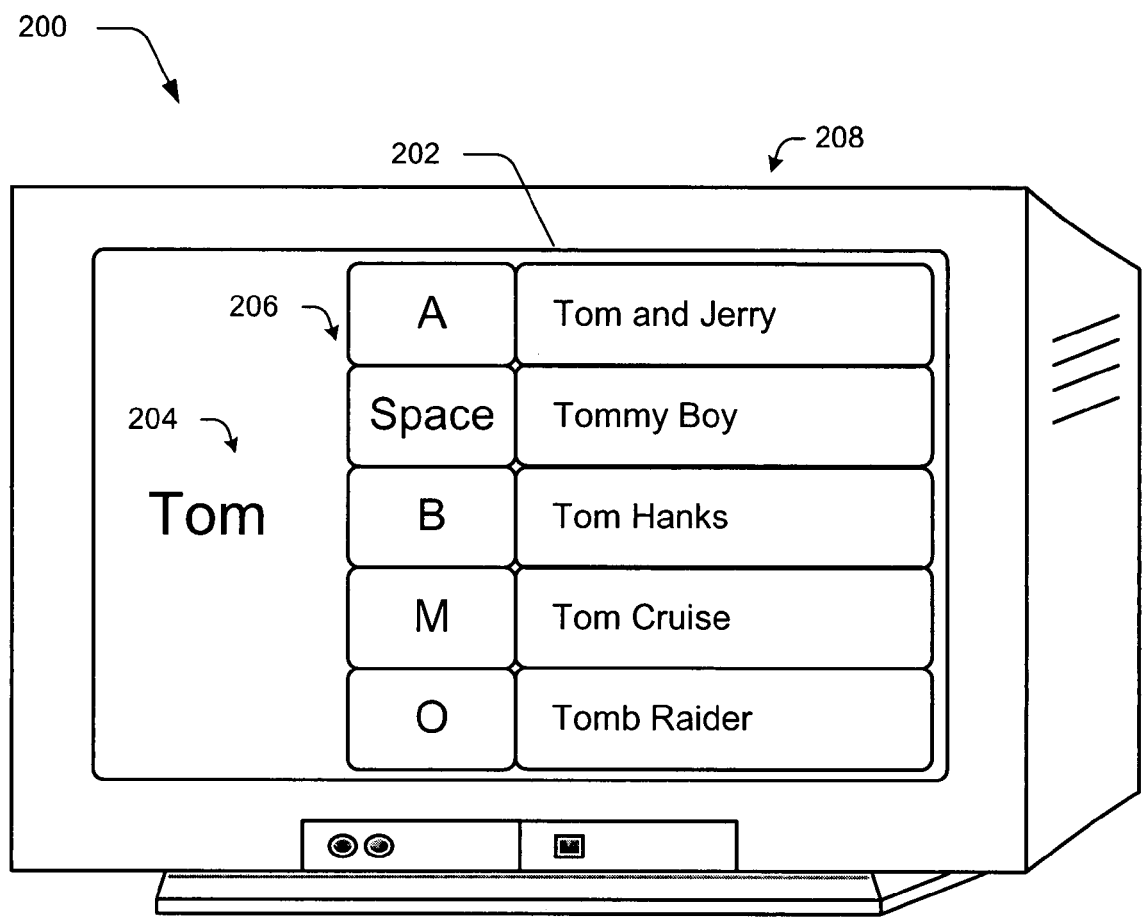
FIG. 2 is an illustration of an embodiment of an exemplary electronic program guide (EPG) as being output and displayed at a client of FIG. 1 that includes EPG search functionality.

FIG. 2 depicts an embodiment 200 of an exemplary electronic program guide (EPG) 202 as being output and displayed at a client that includes EPG search functionality. The EPG 202 includes a display portion 204 that is configured to display textual inputs that have been entered for performing a search. The illustrated EPG 202 is an example of a "center locked" EPG that includes an input portion 206 that is selectable to enter text.

The input portion 206 may be configured in a variety of ways, such as to be "predictive" by limiting letters that are displayed in the input portion 206 to those that have corresponding results that are available based on characters that have already been entered. For instance, the display portion 204 is illustrated as including the letters "Tom". Accordingly, the input portion 206 may include the next letters that are available for the letters "Tom", such as "A" (e.g., for "Tomato"), a "space" (e.g., to enter a name such as "Tom Hanks"), a "B" (e.g., for "Tomb Raider"), an "M" (e.g., for "Tommy Boy"), an "O" (e.g., for "Tomorrow Never Dies"), and so on.

The EPG 202 is also illustrated as including a results portion 208 to display one or more results of the search. For example, the results portion 208 may be updated in "real time" as inputs are received via the input portion 206 such that a user can stop providing text inputs once a desired item is displayed. In another implementation, an "enter" key may be used to initiate the search. A variety of other implementations are also contemplated. Thus, the EPG 202 may be used to provide a search of the EPG data 116(e), 122(d) by entering text using the input portion 206 which is displayed in the display portion 204, with results of the search displayed in the results portion 208 in real time.

Figure 3:
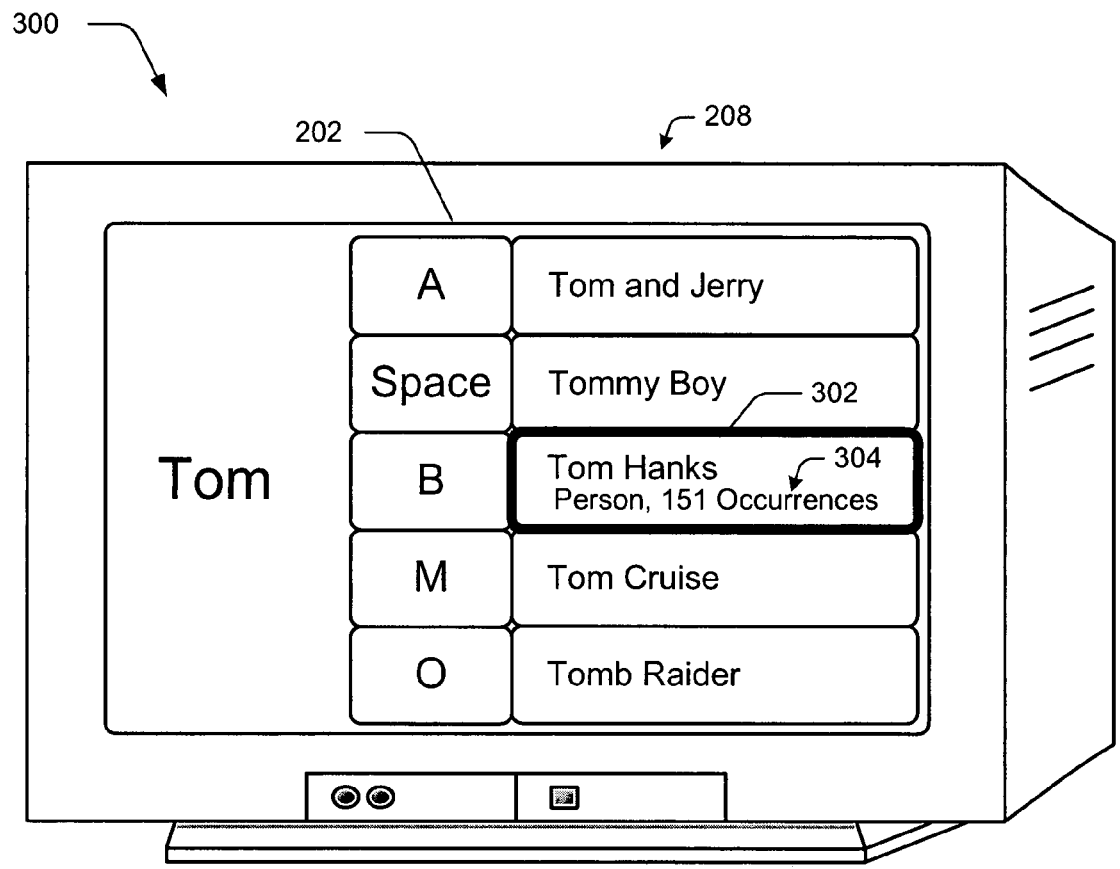
FIG. 3 is an illustration of an embodiment of the exemplary EPG of FIG. 2 as outputting additional data when focus is applied to at least one of the results of a search.

FIG. 3 illustrates an exemplary implementation 300 of the EPG 202 of FIG. 2 as outputting additional data when focus is applied to at least one of the results of a search. The EPG 202 of FIG. 3 substantially corresponds to the EPG 202 of FIG. 2. However, focus has been applied to a portion 302 of the search results in the results portion 208, which is illustrated as a heavy border surrounding the portion 302. It should be readily apparent that a variety of other techniques are also contemplated to indicate focus, such as through use of an overlay, color change, and so on. The portion 302 may be focused in a variety of ways, such as through "tabbing" through the cells in the EPG 202 using a keyboard, through use of arrow keys of a remote control of the client 104 when configured as a set-top box, and so on.

When the focus is applied to the portion 302, additional data 304 is displayed within the portion 302, which in this instance is illustrated as "Person, 151 Occurrences". Thus, in this instance the user is informed in a non-modal manner as to a number of occurrences of that particular item represented in the EPG, thereby "giving the user a clue" as to further navigation that may be performed without leaving the currently displayed EPG 202.

The user may then select the portion 302 to further "drill down" through a hierarchy. For example, the portion 302 that relates to "Tom Hanks" may be configured as a single object that encapsulates a plurality of related EPG data 116(e), 122(d), which in this instance is the EPG data that relates to "Tom Hanks". Thus, rather than immediately describe each item of television content that relates to "Tom Hanks" as was performed using traditional techniques, a "higher level" of the hierarchy may be displayed to group these items. The single object may also have associated metadata which describes items encapsulated within the object, such as information describing a television series, a person, and so on. Thus, the single object may be used to conserve valuable resources by eliminating repetition of the data for each of the encapsulated items (e.g., television content) included in the single object. Further discussion of encapsulation may be found in relation to the exemplary procedure.

Figure 4:
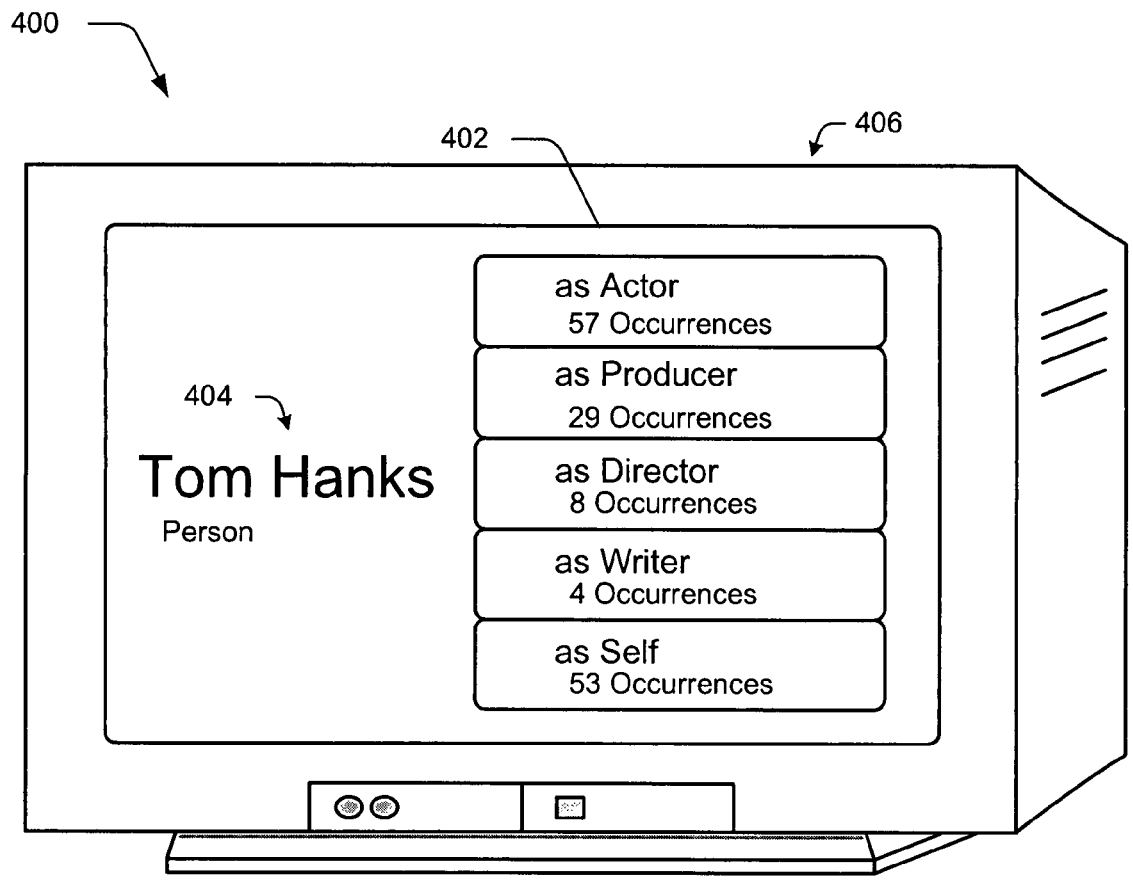
FIG. 4 is an illustration of an embodiment of an exemplary EPG output due to selection of a search result of the EPG of FIG. 2.

FIG. 4 illustrates an embodiment 400 of an exemplary EPG 402 output due to selection of one of the search results of the exemplary EPG 202 of FIG. 2. The EPG 402 includes a portion 404 indicating a current level within a hierarchy of categories, which in this instance is illustrated as "Tom Hanks, Person" that corresponds to the portion selected in the exemplary EPG 202 of FIG. 2.

The EPG 402 also includes a portion 406 that indicates sub-categories that may be further selected, which are illustrated "as Actor, 57 Occurrences", "as Producer, 29 Occurrences", "as Director, 8 occurrences", "as Writer, 4 Occurrences" and "as Self, 53 Occurrences". Thus, like before the user is "given a clue" as to an amount of EPG available in the various sub-categories. Although this additional information is shown as displayed without applying focus to the respective portions, the focus functionality previously described in relation to FIG. 3 may also be utilized without departing from the spirit and scope thereof. Therefore, a user viewing the EPG 402 of FIG. 4 may be directed to various sub-categories of the EPG data that may be of interest.

Figure 5:
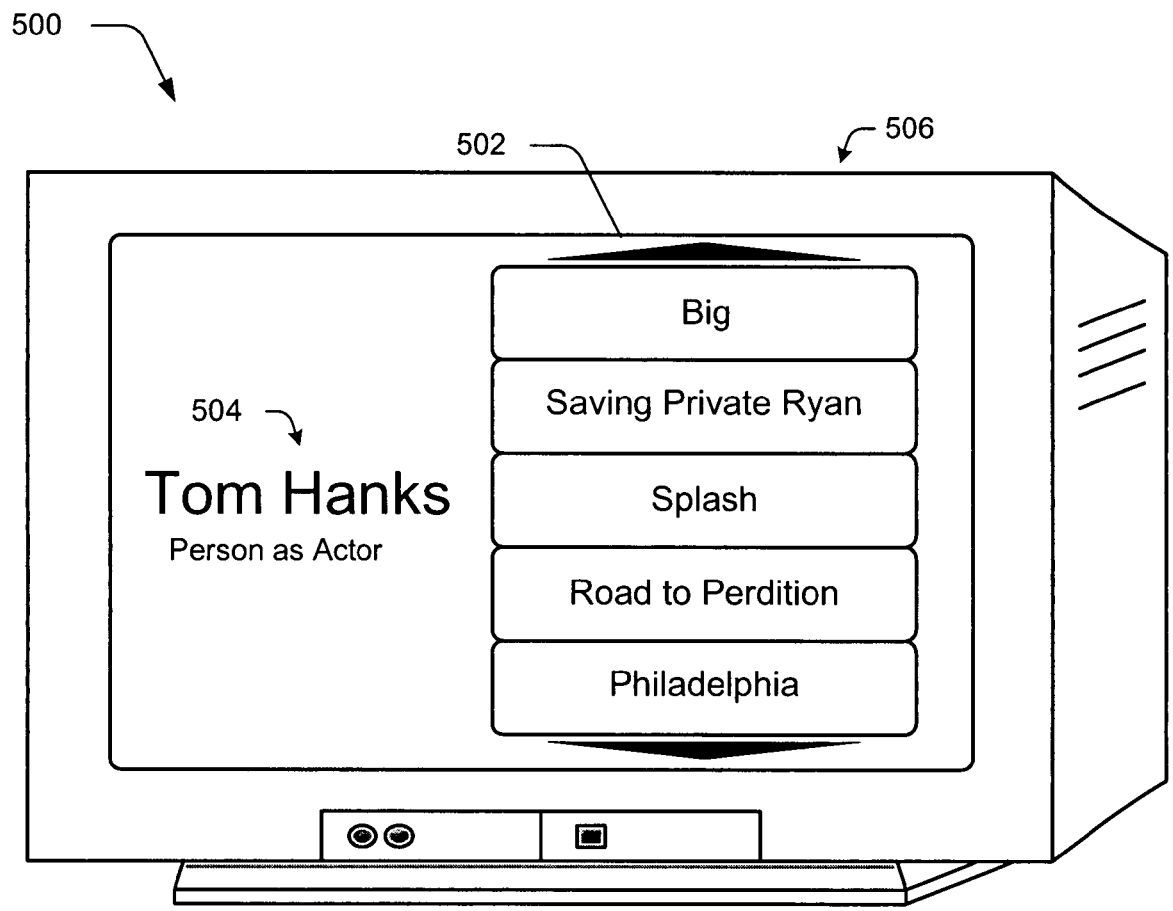
FIG. 5 is an illustration an embodiment of an exemplary EPG output due to selection of one of the sub-categories of search results of the exemplary EPG to FIG. 4.

FIG. 5 illustrates an embodiment 500 of an exemplary EPG 502 output due to selection of one of the sub-categories of search results of the exemplary EPG 402 of FIG. 4. In the embodiment 400 of FIG. 4, the user may use an input device (e.g., a remote control) to select Tom Hanks "as Actor" which causes the EPG 502 to be output that includes a portion 504 indicating "where" the user is currently located in the hierarchy of categories.

The EPG 502 also includes a plurality of search results 506 that describe television content within the subcategory, which are illustrated as "Big", "Saving Private Ryan", "Splash", "Road to Perdition" and "Philadelphia". Thus, at this point the user has entered "Tom", selected "Tom Hanks, Person" to output the EPG 402 of FIG. 4, selected "as Actor" to cause output of the EPG 502 of FIG. 5, and may now select from a variety of choices of television programs, such as "Splash".

Figure 6:
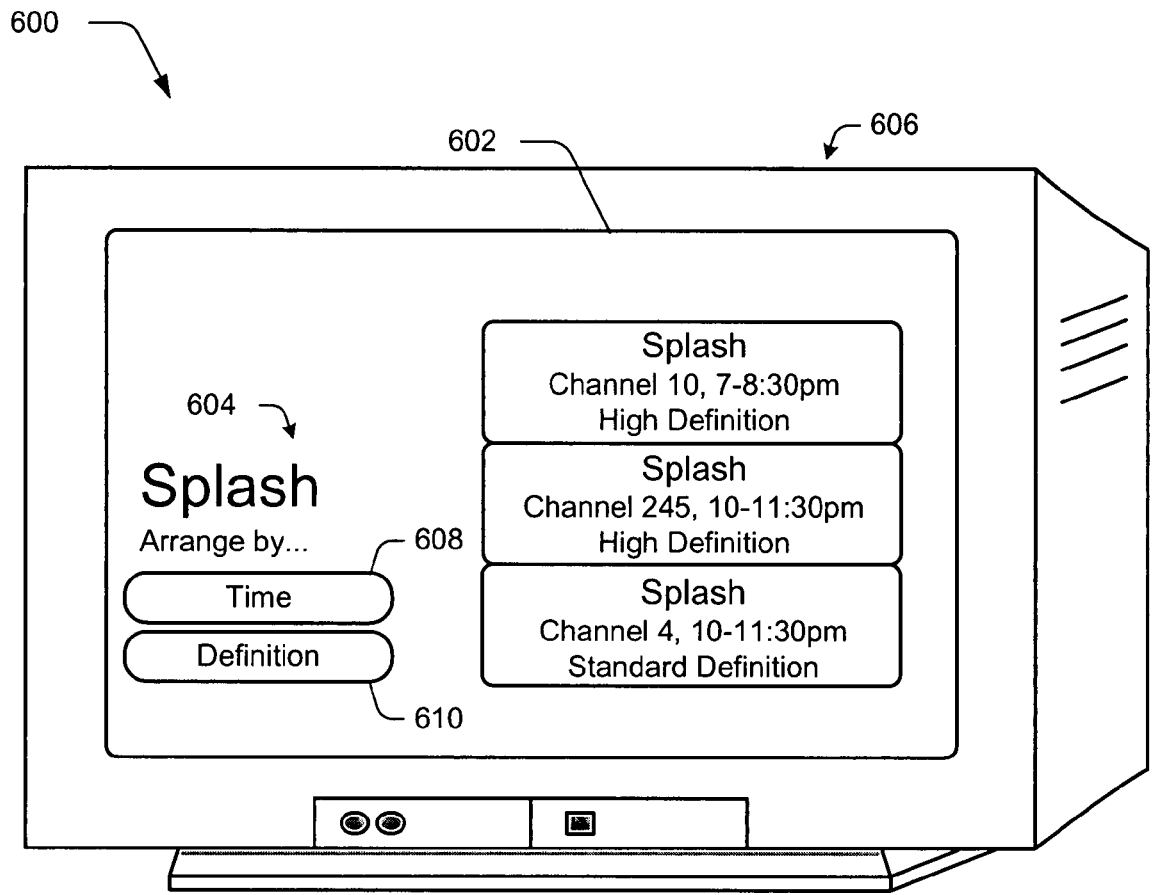
FIG. 6 is an illustration an embodiment of an exemplary EPG output due to selection of one of the search results of the exemplary EPG of FIG. 5.

FIG. 6 illustrates an embodiment 600 of an exemplary EPG 602 output due to selection of one of the search results of the exemplary EPG 502 of FIG. 5. The user in FIG. 5 may select the option "Splash" from the EPG 502, which causes output of the EPG 602 of FIG. 6 having a portion 604 that describes the television content selected and a portion 606 describing when the selected television content is available. The television content described in the portion 606 may be arranged in a variety of ways, such as prioritized based on time (e.g., television content times that are nearest to the current time), definition (e.g., whether the television content is output in high definition or standard definition), cost (e.g., whether the television content is available free via broadcast or for a fee from video on demand), and so on. The user may also be given options to sort using these different techniques, which are illustrated as time 608 and definition 610. Thus, instead of providing every movie, television episode, and so on that involves Tom Hanks in a single screen of an EPG, the EPG may be arranged accordingly to categories and sub-categories to provide a hierarchy that may be navigated to locate EPG data and respective television content of interest. It should be apparent that a wide variety of hierarchical category arrangement is contemplated and therefore is not limited to the example of FIGS. 2-6.

Exemplary Procedure

The following discussion describes EPG search techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the EPGs of FIGS. 2-6, respectively.

Figure 7:
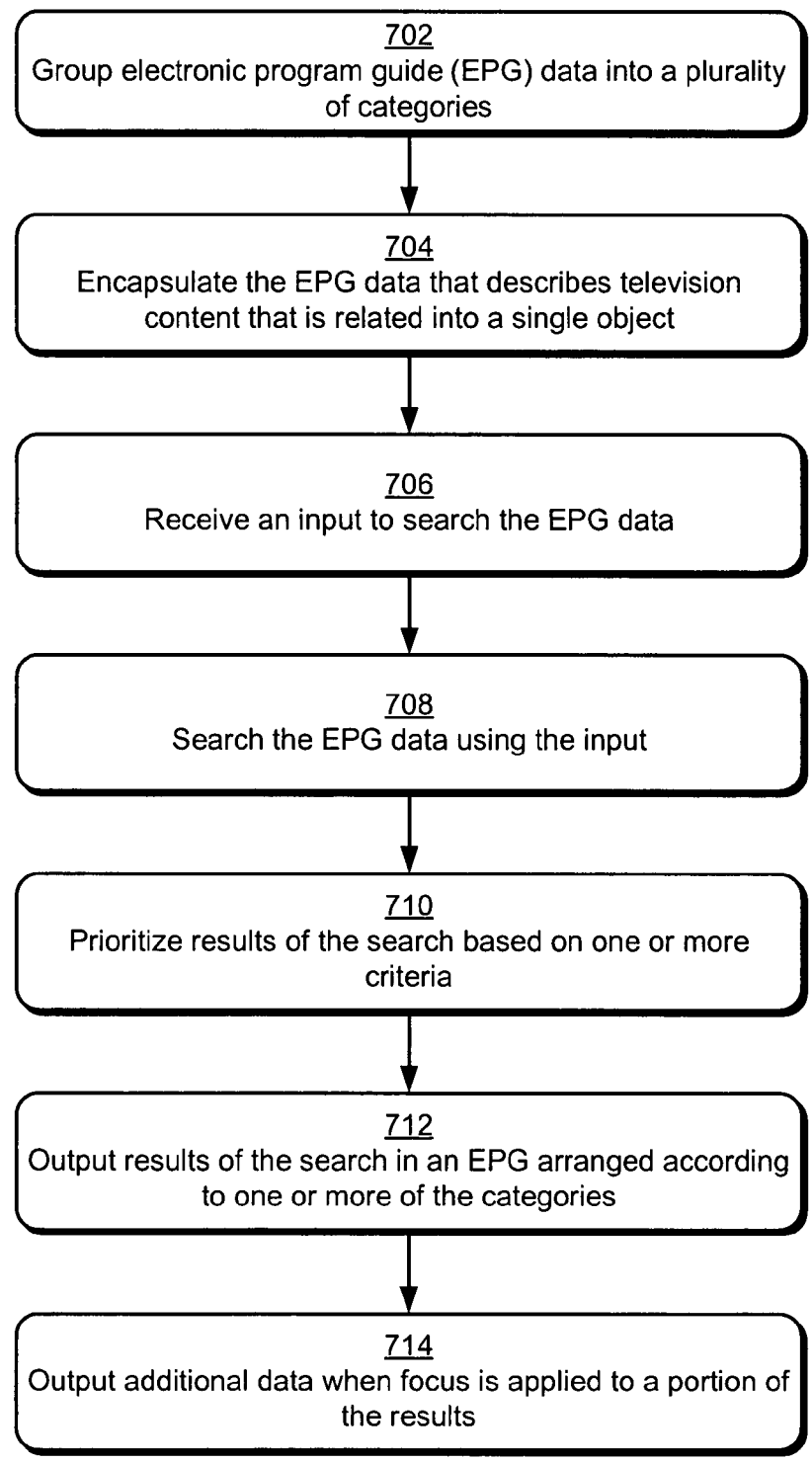
FIG. 7 is a flow diagram depicting a procedure in an exemplary implementation in which electronic program guide (EPG) data is categorized for use in a search. EPG data that describes television content that is related is encapsulated within a single object. The EPG data is then searched, the result of which is output and configured such that when focus is applied, additional data is output.

FIG. 7 depicts a procedure 700 in an exemplary implementation in which electronic program guide (EPG) data is categorized for use in a search. EPG data that describes television content that is related is encapsulated within a single object. The EPG data is then searched, the result of which is output and configured such that when focus is applied, additional data is output.

EPG data is grouped into a plurality of categories (block 702). For example, the EPG data may be grouped into categories that are likely to be used to navigate to particular items of content. FIG. 4, for instance, gives an examples of categories such as "actor", "producer", "director", "writer" and "self" for Tom Hanks. A variety of other categories are also contemplated.

EPG data that describes television content that is related is encapsulated into a single object (block 704). Continuing with the previous example, a single object may be configured to encapsulate data related to "Tom Hanks" This object may then be used in an EPG to globally represent the different types of data that is related to Tom Hanks, thereby reducing "clutter" of the EPG. A variety of other examples are also contemplated, such as the "West Wing" example previously described which was used to encapsulate individual episodes of a television series. The single object may also include associated metadata that references the relationship of the encapsulated data (e.g., a television series), include metadata that is common to the encapsulated data to reduce redundancy, and so on.

An input is received to search the EPG data (block 706), such as by entering one or more characters using the user interface 200 of FIG. 2. The EPG data is then searched using the input (block 708), such as by matching the one or more characters with characters in the EPG data.

Results of the search are then prioritized based on one or more criteria (block 710). A variety of criteria may be used, such as number of occurrences, assigned weighting, based on a personal viewing history of a user that provided the input, based on similar peer groups that have provided similar inputs, time of day, and so on. For instance, one criterion that may be used is an "occasion", such as whether the search was performed during a particular holiday (e.g., Christmas, New Year's Day, Easter) and applying an ordering accordingly. A variety of other instances are also contemplated.

Results of the search are output in an EPG arranged according to one or more of the categories (block 712), such as displayed accordingly to the user interface 200 of FIG. 2. When focus is applied to a portion of the results, additional data is output (block 714), which may be used to further describe data already included in the respective portion, an example of which is shown and discussed in relation to FIG. 3.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by one or more devices, the method comprising:
   receiving one or more inputs that specify one or more letters to be used in a search of electronic program guide (EPG) data;
   searching the EPG data that describes television content using the one or more letters;
   arranging results of the search into one or more of a plurality of categories;
   outputting the one or more letters specified by the one or more inputs and the arranged results of the search in an EPG, the arranged results including category identifiers that each identify a respective arranged result and that are respectively associated with the one or more of the plurality of categories;
   outputting, responsive to receiving an input that applies a focus on a display portion of the EPG associated with an instance of the arranged results of the search, and within a part of the display portion to which the focus is applied:
      a respective category identifier associated with the instance of the arranged results, an indication of a number of occurrences of the instance of the arranged results of the search in said one or more of the plurality of categories, and additional information about the instance of the arranged result; and
   outputting, responsive to a selection of the instance of the arranged results:
      the category identifier associated with the instance of the arranged results and the additional information about the instance of the arranged results in place of the one or more letters specified by the one or more inputs, and a plurality of sub-categories associated with the instance of the arranged results, including for each of the plurality of sub-categories an indication of a number of occurrences of a respective sub-category of the plurality of sub-categories.

2. A method as described in claim 1, wherein the outputting of the arranged results is performed such that the results in at least one of the categories are prioritized over the results in another one of the categories.

3. A method as described in claim 1, wherein the arranged results are prioritized based on one or more criteria selected from a group consisting of:
   number of entries;
   assigned weighting;
   personal viewing history;
   peer groups; and
   time of day.

4. A method as described in claim 1, wherein the outputting of the arranged results is performed such that the results are prioritized based on one or more occasions.

5. A method as described in claim 4, wherein at least one of the occasions is a holiday.

6. A method as described in claim 1, wherein:
   the outputting of the arranged results is performed such that a portion is output in the EPG for each of the one or more categories; and
   the portions are selectable to navigate to the EPG data for the television content associated with the one or more categories.

7. A method as described in claim 6, wherein at least one of the portions is configured such that when the focus is applied to the at least one portion, the additional information about the instance of the arranged results output within the portion further describes the television content associated with the portion.

8. A method as described in claim 7, wherein:
   the at least one said portion is a single object that encapsulates a plurality of related television content; and
   the additional information about the instance of the arranged results is taken from metadata associated with the single object.

9. A method implemented by one or more devices, the method comprising:
   outputting individually selectable portions for each of one or more letters that are selectable to initiate a search of electronic program guide (EPG) data;
   receiving one or more inputs that specify one or more of the letters that are selected to be used in the search of the EPG data;
   searching portions of the EPG data that describe television content using the one or more of the letters that are selected;
   encapsulating search results that describe an entity associated with the television content and a plurality of roles for the entity in the television content;
   outputting the one or more letters specified by the one or more inputs;
   outputting, with the one or more letters specified by the one or more inputs: the encapsulated search results that describe the entity, encapsulated search results that describe one or more other entities associated with the television content, and entity identifiers that identify respective encapsulated search results, the entity identifiers being respectively associated with said entities described by the encapsulated search results;

outputting, when a focus is applied to the encapsulated search results that describe the entity: an indication of a number of the encapsulated search results that describe the entity, a respective entity identifier for the entity, and additional information about the encapsulated search results that describe the entity within a portion of the EPG to which the focus is applied; and outputting, responsive to a selection of the encapsulated search results that describe the entity: the respective entity identifier and the additional information about the encapsulated search results that describe the entity in place of the one or more letters specified by the one or more inputs, and individually selectable portions for each of the plurality of the roles, the selectable portions being selectable to navigate to a graphical user interface that displays indications of instances of television content associated with a respective role of the plurality of roles, including for each of the individually selectable portions a number of occurrences of the television content associated with a respective role and a role identifier identifying the respective role.

10. A method as described in claim 9, further comprising outputting, in response to a selection of one of the selectable portions, a single representation of a television series associated with the entity, wherein the single representation of the television series is selectable to display representations of different episodes of the television series such that the representations of the different episodes are not repeated.

11. A method as described in claim 10, wherein the single representation of the television series is configured to include metadata that describes the television series and selectable options for channels on which one or more of the different episodes may be viewed.

12. A method as described in claim 11, wherein the metadata is displayed responsive to applying focus to the single representation of the television series.

13. A method as described in claim 9, further comprising:
outputting, in response to a selection of one of the selectable portions, the graphical user interface that displays indications of instances of television content associated with a respective role of the plurality of roles; and
arranging the indications of instances of television content in the graphical user interface based on at least one of a definition for each of the instances or a cost for each of the instances.

14. A method as described in claim 9, wherein the roles comprise one or more of actor, producer, director, or writer.

15. A system comprising:
one or more processors;
one or more computer-readable storage devices storing computer-executable instructions that, when executed via the one or more processors, cause the system to perform operations comprising:
receiving one or more inputs that specify one or more letters to be used in a search of electronic program guide (EPG) data;
searching the EPG data that describes television content using the one or more letters;
arranging results of the search into one or more of a plurality of categories;
outputting the one or more letters specified by the one or more inputs and the arranged results of the search with category identifiers in an EPG, the category identifiers identifying a respective arranged result and being associated with said one or more of the plurality of categories respectively;
outputting, responsive to receiving an input that applies a focus on a display portion of the EPG associated with an instance of the arranged results of the search, and within a part of the display portion to which the focus is applied: the category identifier associated with the instance of the arranged results, an indication of a number of occurrences of the instance of the arranged results of the search in said one or more of the plurality of categories, and additional information about the instance of the arranged results; and
outputting, responsive to a selection of the instance of the arranged results: the category identifier associated with the instance of the arranged results and the additional information about the instance of the arranged results in place of the one or more letters specified by the one or more inputs, and a plurality of sub-categories associated with the instance of the arranged results, including for each of the plurality of sub-categories an indication of a number of occurrences of a respective sub-category of the plurality of sub-categories.

16. A system as described in claim 15, wherein the outputting of the arranged results is performed such that the results in at least one of the categories are prioritized over the results in another one of the categories.

17. A system as described in claim 15, wherein the outputting of the arranged results is performed such that the results are prioritized based on one or more occasions.

18. A system as described in claim 15, wherein:
the outputting of the arranged results is performed such that a portion is output in the EPG for each of the one or more categories; and
the portions are selectable to navigate to the EPG data for the television content associated with the one or more categories.

19. A system as described in claim 18, wherein at least one of the portions is configured such that when the focus is applied to the at least one portion, additional information about a respective instance of the arranged results output within the portion further describes the television content associated with the portion.

20. A system as described in claim 19, wherein:
the at least one said portion is a single object that encapsulates a plurality of related television content; and
the additional information about the respective instance of the arranged results is taken from metadata associated with the single object.

* * * * *